(12) United States Patent
Madoux et al.

(10) Patent No.: US 10,337,369 B2
(45) Date of Patent: Jul. 2, 2019

(54) ENGINE EXHAUST GAS ADDITIVE STORAGE TANK

(75) Inventors: Dominique Madoux, Rumes (FR); Stephane Leonard, Brussels (BE); Jules-Joseph Van Schaftingen, Wavre (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 813 days.

(21) Appl. No.: 13/989,648

(22) PCT Filed: Nov. 21, 2011

(86) PCT No.: PCT/EP2011/070525
§ 371 (c)(1),
(2), (4) Date: Aug. 8, 2013

(87) PCT Pub. No.: WO2012/069396
PCT Pub. Date: May 31, 2012

(65) Prior Publication Data
US 2013/0313137 A1 Nov. 28, 2013

(30) Foreign Application Priority Data
Nov. 24, 2010 (FR) .................................. 10 59681

(51) Int. Cl.
*F01N 3/00* (2006.01)
*F01N 3/20* (2006.01)

(52) U.S. Cl.
CPC ............ *F01N 3/00* (2013.01); *F01N 3/2066* (2013.01); *F01N 2610/02* (2013.01);
(Continued)

(58) Field of Classification Search
CPC ....... B01D 53/56; F01N 3/2026; F01N 3/208; F01N 2610/02; F01N 2610/10;
(Continued)

(56) References Cited

U.S. PATENT DOCUMENTS 1,464,255 A * 8/1923 Zimmermann .......... H05B 3/00
                                                    219/239
1,952,856 A * 3/1934 Green .................... F24H 1/102
                                                    392/451
(Continued)

FOREIGN PATENT DOCUMENTS

CN          101069329 A       11/2007
CN          101238275 A        8/2008
(Continued)

OTHER PUBLICATIONS

Office Action dated Oct. 5, 2015 in Japanese Patent Application No. 2013-540308 (with English language translation).

(Continued)

*Primary Examiner* — Ibrahime A Abraham
*Assistant Examiner* — Chris Q Liu
(74) *Attorney, Agent, or Firm* — Oblon, McClelland, Maier & Neustadt, L.L.P.

(57) ABSTRACT

A tank for storing an internal combustion engine exhaust gas liquid additive, the tank including a wall defining an internal volume, an electrical component located in the internal volume, and at least one electric cable configured to connect the electrical component to a voltage source outside the tank, at least one portion of the electric cable being inserted into an intermediate part connected to a base plate mounted over an opening in the wall, the base plate incorporating a casing mounted leaktight around an orifice in the base plate. The intermediate part is fastened by a quick-connect coupling including an electrical connector to which the electric cable is connected leaktight with aid of a seal and that emerges from the orifice in the base plate to outside the tank. The seal is inserted between the intermediate part and the connector and/or into a housing of the intermediate part.

16 Claims, 6 Drawing Sheets

Figure 1:
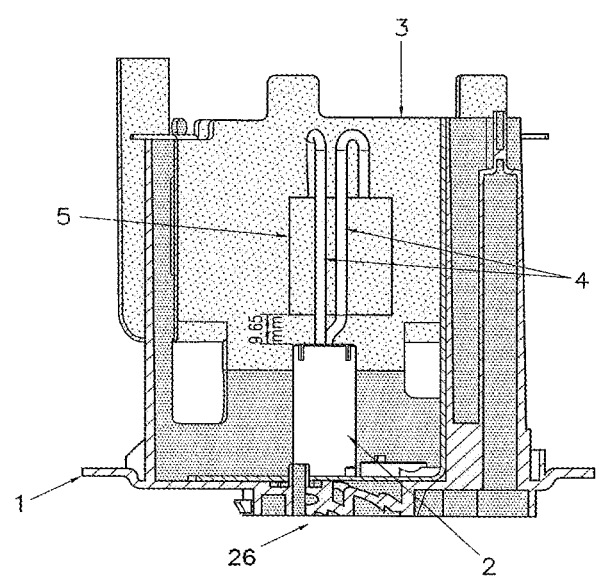

(52) U.S. Cl.
CPC .. *F01N 2610/10* (2013.01); *F01N 2610/1406* (2013.01); *Y02T 10/24* (2013.01); *Y10T 29/49826* (2015.01)

(58) Field of Classification Search
CPC .. F01N 2610/1406; F01N 3/00; F01N 3/2066; Y02T 10/24; Y10T 29/49826
USPC ......... 206/216; 219/202, 205, 385, 435–437, 219/523; 392/444; 29/428
See application file for complete search history.

(56) References Cited

U.S. PATENT DOCUMENTS

| | | | | |
|---|---|---|---|---|
| 2,860,226 | A * | 11/1958 | Williams | H05B 3/82 219/436 |
| 3,040,284 | A * | 6/1962 | Connell | H01B 7/16 102/275.1 |
| 4,021,643 | A * | 5/1977 | Hall | A01K 63/065 219/513 |
| 4,171,346 | A * | 10/1979 | King | B01J 8/1836 219/390 |
| 4,186,369 | A * | 1/1980 | Attridge | H05B 3/06 219/541 |
| 4,622,455 | A * | 11/1986 | Schwarzkopf | H05B 3/06 219/523 |
| 5,595,497 | A * | 1/1997 | Wood | H01R 13/523 439/282 |
| 8,383,996 | B2 * | 2/2013 | Woelper | H05B 3/44 219/202 |
| 2004/0001769 | A1 | 1/2004 | Kempfer et al. | |
| 2007/0020413 | A1 * | 1/2007 | Moriuchi | B65D 41/24 428/34.9 |
| 2009/0078692 | A1 * | 3/2009 | Starck | F01N 3/2066 219/260 |
| 2009/0230136 | A1 * | 9/2009 | Dougnier | F01N 3/2066 220/592.01 |
| 2010/0215523 | A1 | 8/2010 | Homma et al. | |
| 2010/0303453 | A1 * | 12/2010 | Haeberer | F01N 3/2066 392/449 |
| 2011/0023466 | A1 * | 2/2011 | Branco | B01D 53/90 60/286 |
| 2011/0138790 | A1 * | 6/2011 | Radillo | F01N 3/206 60/303 |

FOREIGN PATENT DOCUMENTS

| | | |
|---|---|---|
| CN | 201162561 Y | 12/2008 |
| DE | 40 35 673 A1 | 5/1992 |
| GB | 2 292 267 A | 2/1996 |
| GB | 2 390 234 | 12/2003 |
| JP | 2009-243331 A | 10/2009 |
| JP | 2009-261221 A | 11/2009 |
| JP | 2010-196620 A | 9/2010 |
| WO | 2008 138757 | 11/2008 |
| WO | WO 2008/138960 A1 | 11/2008 |

OTHER PUBLICATIONS

Office Action dated Nov. 6, 2015 in Russian Patent Application No. 2013128599/06 (with English language translation).
Combined Office Action and Search Report dated Feb. 28, 2015 in Chinese Patent Application No. 201180065687.1 (with English translation of category of cited documents).
European Search Report dated Jun. 10, 2011 in Application No. FR1059681 Filed Nov. 24, 2010.
International Search Report dated Jan. 19, 2012 in PCT/EP11/070525 Filed Nov. 21, 2011.

* cited by examiner

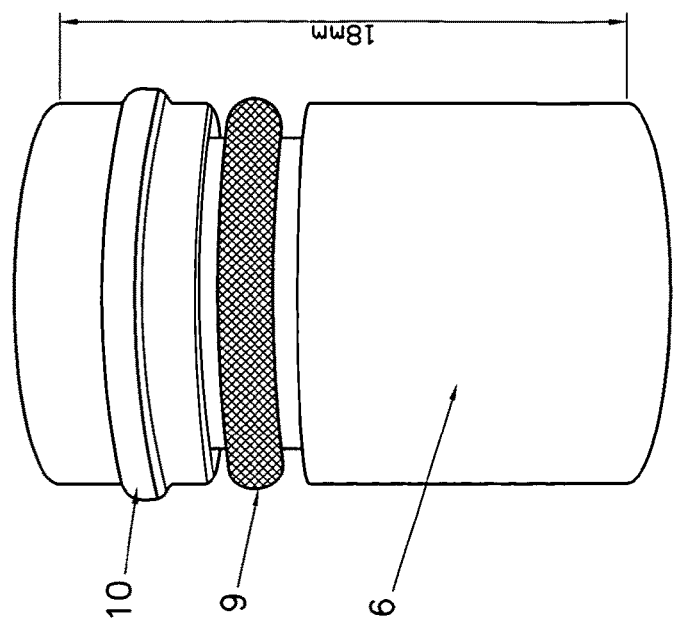
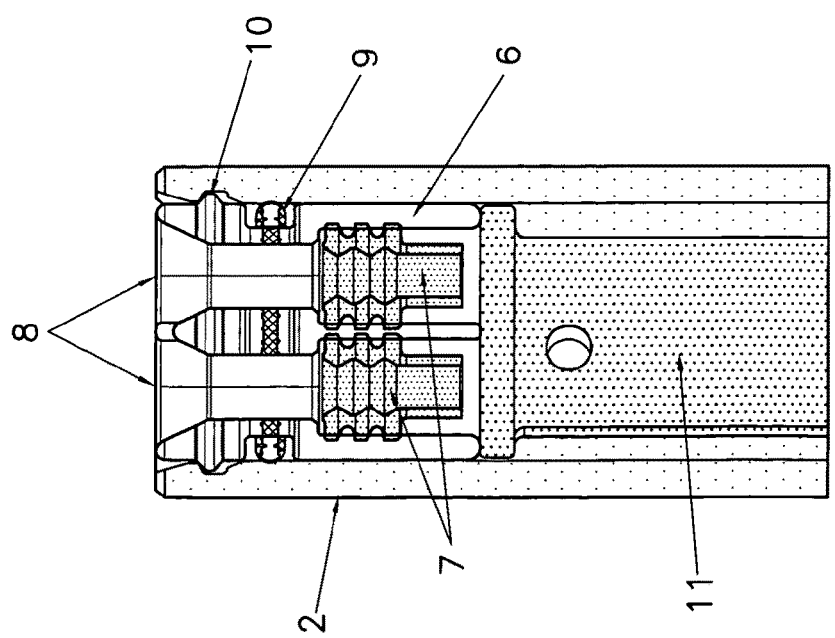
Fig. 4
Fig. 3

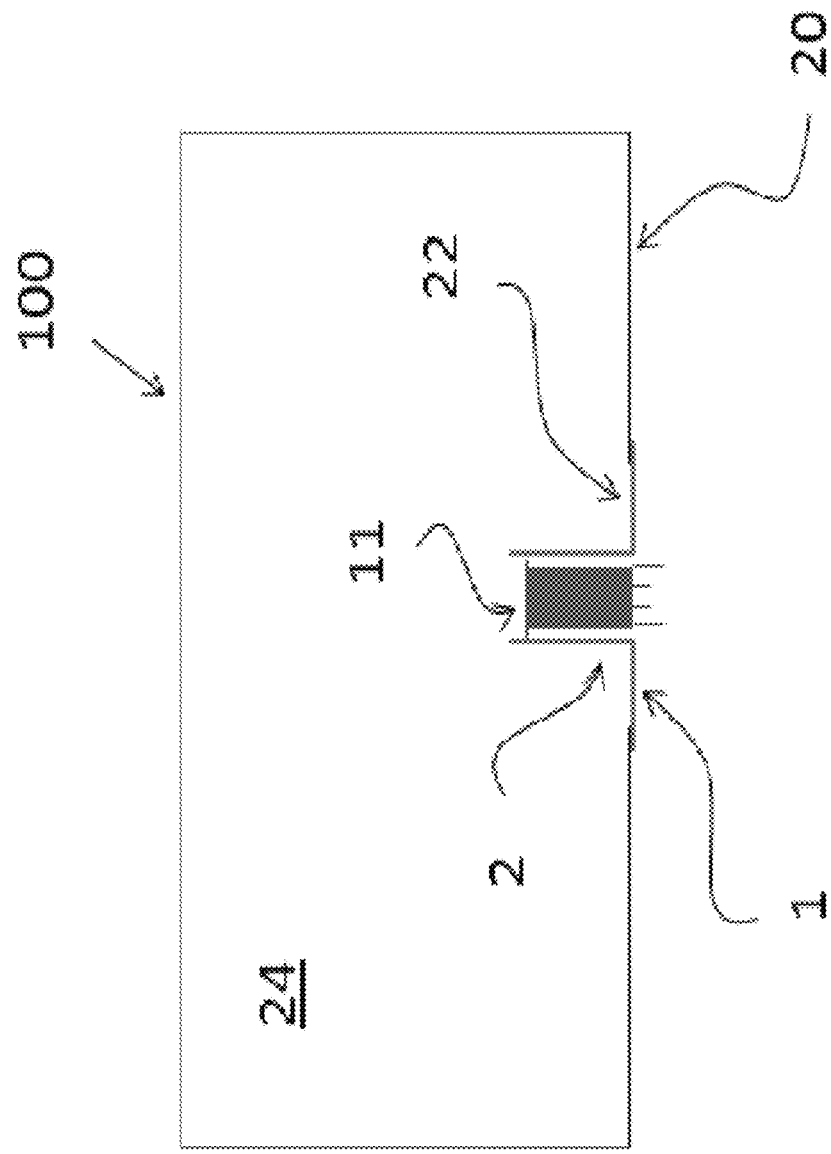

ENGINE EXHAUST GAS ADDITIVE STORAGE TANK

The present application relates to an engine exhaust gas additive storage tank.

Legislation on vehicle and truck emissions stipulates, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process, the high levels of $NO_x$ produced in the engine during combustion at optimized efficiency are treated in a catalytic converter on exiting the engine. This treatment requires the use of the reducing agent at a precise concentration and of extreme quality. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive (generally urea) solution and also with a device for metering the desired amount of additive and injecting it into the exhaust line.

In order to be able to correctly meter the solution of additive into the exhaust gases, it is common practice to incorporate into the additive tank electrical components such as a level gauge, a temperature sensor, a quality sensor, a resistive heating element, etc. These components require electrical lines to one (or more) wiring harness(es) or one (or more) other component(s) of the vehicle or of the SCR system, located outside of the additive storage tank, which poses several problems. First, the additive solutions are generally corrosive and standard conductive materials are not resistant or are poorly resistant thereto. Next, the leaktightness must be maintained where the lines emerge from the tank, which may also lead to problems, especially in the long term.

Application WO 2008/138757 proposes various solutions for a line connection through the cover of a heated swirl pot of a urea tank, in which the line passes through said cover and is equipped with a seal, this seal being in the form of an elastic plug which is inserted in a leaktight manner into a housing of said cover.

In all the solutions described in that document, the leaktightness is maintained thanks to the use of one or more seals (30 in the figures); to a direct vulcanization of the seal onto the cable or to an element for tensioning the seal around the cable (38 in the figures); and to a holder (34 in the figures) which is bolted to the cover. Such an assembly is therefore relatively complicated and expensive.

In one variant (that of FIG. 5), two cables each equipped with an O-ring (30) are mounted in an intermediate part (39), itself mounted in the cover with the aid of a seal (43). Such a solution is not intended to be permanently submerged in an additive solution of the aqueous urea solution type. Indeed, the portion between the O-ring (43) and the inside of the tank is not leaktight. In the event of a freeze/thaw cycle, the expansion of the additive between the intermediate part and the housing may cause the leaktightness of the assembly to be lost and/or the assembly to be damaged. Moreover, the two seals (30) around the cables of the heater are not isolated from the outside by the intermediate part. On the contrary, they are exposed to the outside environment and they are only supported at the centre of the intermediate part (39). Such a configuration may also lead to losses of leaktightness, in particular for submerged solutions. Moreover, given that the two wires emerge from the tank by passing through said seals, the mounting of the tank onto the vehicle involves carefully making the electrical connection of these two wires to the voltage source.

Patent EP 2029865 in the name of the Applicant precisely proposes a base plate, including a swirl pot, which is submerged i.e. mounted via an opening in the lower wall of the tank. In order to heat the urea contained in the tank and in particular in the swirl pot, this base plate preferably also incorporates a heating element as described in the aforementioned application WO'757 and preferably a flexible heater as described in application WO 2008/138960 also in the name of the Applicant, the content of which is incorporated by reference in the present application.

In this solution, the electrical connections (not only of the heating element, but also of other electrical accessories such as listed above) must be made through an opening in the submerged base plate, which is made of plastic and preferably injection-moulded.

The idea behind the present invention is to render the fastening systems described in application WO'757 compatible with submerged solutions, while at the same time simplifying them. This objective is achieved by making sure that neither the seals nor the wires emerge from the tank, owing to the use of a casing in which a pre-assembled connection assembly may be mounted easily and in a leaktight manner by simple quick-connect coupling.

The present invention therefore relates to a tank for storing an internal combustion engine exhaust gas liquid additive, said tank comprising a wall defining an internal volume (24), an electrical component located in the internal volume (24) and at least one electric cable allowing to connect said component to a voltage source outside the tank, at least one portion of the electric cable being inserted into an intermediate part connected to a base plate mounted on an opening in the wall of the tank. According to the invention, the base plate incorporates a casing mounted in a leaktight manner around an orifice (26) in the base plate, in which the intermediate part is fastened by quick-connect coupling (28) and which also comprises an electrical connector to which the electric cable is connected in a leaktight manner with the aid of a seal and which emerges from the orifice (26) in the base plate to the outside of the tank.

The additive of the invention is preferably a reducing agent capable of reducing the NOx present in the exhaust gases of internal combustion engines. It is advantageously an ammonia precursor in aqueous solution. The invention gives good results with aqueous solutions of urea and in particular, eutectic water/urea solutions such as solutions of AdBlue®, the urea content of which is between 31.8 wt % and 33.2 wt % and which contain around 18% of ammonia. The invention may also be applied to urea/ammonium formate mixtures also in aqueous solution, sold under the trademark Denoxium® and which contain around 13% of ammonia. The latter have the advantage, with respect to urea, of only freezing from −35° C. onwards (as opposed to −11° C.), but have the disadvantages of corrosion problems linked to the release of formic acid.

The present invention may be applied to any internal combustion engine likely to generate NOx in its exhaust gases. It may be an engine with or without a fuel return line (that is to say, a line returning the surplus fuel not consumed by the engine to the fuel tank). It is advantageously applied to diesel engines, and in particular to vehicle diesel engines and particularly preferably to the diesel engines of trucks.

The tank according to the invention comprises a wall which may be made from any material, preferably one that is chemically resistant to the additive. In general, this material is metal or plastic. In the case of urea, polyolefin resins, in particular polyethylene (and more particularly HDPE or high-density polyethylene), polyamides (PAs) and also polyacetals, and in particular POM (polyoxymethylene), constitute preferred materials. These same materials may also be used for the leaktight casing of the tank according to the invention and also for the base plate and/or the intermediate part. It should be noted that polyamides (PAs) are particularly suitable for these parts, and in particular PA-6,6.

According to the invention, the wall of the tank comprises at least one opening, mounted on which is a base plate comprising an orifice around which a casing is mounted in a leaktight manner.

The expression "base plate" is understood to mean a part comprising a mounting plate or flattened part (i.e. the thickness of which is significantly smaller (for example: by at least a factor of 5, or even 10) than its other dimensions and which is substantially planar) intended to close an opening in its wall, preferably in the upper or lower portion thereof (respectively referred to as upper wall and lower wall). It should be noted that in the latter variant, which is preferred, the base plate may extend to the inside of the tank via a chamber or hollow portion that communicates with the tank via at least one orifice through which the additive may circulate, and which may act as a swirl pot. Preferably, the casing according to the invention is moulded as one piece with the base plate and preferably, it is injection moulded. It may however be closed by a cover mounted separately.

The expression "lower wall" is in fact understood to mean the lower half of the tank when it is mounted on the vehicle (whether or not it is moulded in one piece or from two parison sheets or cut-outs).

The base plate according to this variant is, in particular, highly suited to supporting accessories which pass through the wall of the tank and/or are positioned inside the latter. It has a perimeter that is closed up on itself, of any shape. Usually, its perimeter has a circular shape.

Preferably, the electrical component, at least one portion of which is in the tank according to the invention, is chosen from the following elements: a level gauge, a temperature sensor, a quality sensor, a pressure sensor, a pressure regulator, a heating element. These elements may be incorporated into the swirl pot of the tank. The invention is particularly useful when the accessory comprises two electric cables, as is generally the case for a heating element for example. The invention has been successfully applied to a flexible heater as described previously.

The electric cable of this component must be resistant to corrosion by the additive and/or must comprise a coating that imparts this resistance to the assembly. Good results have been obtained with silicone-coated cables. Similarly, good results have been obtained with metallic cables (preferably made of stainless steel) sheathed by a fluoropolymer (PFA or perfluoroalkoxy for example) and preferably provided with a coating (silicone for example).

The intermediate part according to the invention is a hollow part, i.e. comprising at least one housing for the cable and its seal, where necessary. It generally has a cylindrical shape.

According to the invention, the electric cable(s) must allow to connect the electrical component to a voltage source and these cables are connected to an electrical connector, at least one portion of which is also in the leaktight casing, so that the connection to the voltage source may be made more easily, by means of a connector complementary with the one at least partially integrated into the leaktight casing.

The connector according to the invention is preferably also made of PA-6,6, preferably reinforced, for example with glass fibres, which give good results in practice.

The cable(s) are preferably crimped on contacts which are themselves fastened to the electrical connector. As regards the connector, it is preferably almost entirely incorporated in the leaktight casing (so that only its portion for connection to a complementary connector emerges from the tank).

The connection to the voltage source may be made by means of an electronic casing incorporating the complementary connector and preferably, an electronic control unit (or ECU) for the component.

The seal ensuring the leaktightness between the connector and the cable may be inserted between the intermediate part and the connector and/or into a housing of the intermediate part. Preferably, it is either inserted between the intermediate part and the connector, or into a housing of the intermediate part. The latter variant therefore preferably involves the use of a supplementary seal for connecting the intermediate part to the casing in a leaktight manner. It is therefore preferred, since it in fact involves a two-fold sealing. Irrespective of the variant, the seal or seals are preferably made of an elastomeric material such as EPDM or a silicone, the latter being preferred.

The seals sold under the name "single wire seal" by the company Tyco give good results and in particular in the variant where the intermediate part comprises two housings for two cables, each equipped with a seal. These seals comprise a corrugated (annulated) portion, providing a certain movement/an axial flexibility, and also a straight portion for forcibly mounting over a relief. In this variant, it may be advantageous (in order to gain space heightwise and to reduce the size of the parts) to remove from said seals the portion used for forcibly mounting, and which is not necessarily of use within the context of the invention.

According to the invention, the base plate incorporates a casing. The term "incorporates" is understood to mean that either this casing is fastened to the perimeter of the orifice (by welding, bonding, mechanical fastening, etc.), or it is moulded from a single part with it. The latter variant is preferred, in particular for base plates made of plastic.

The casing according to the invention is, by definition, a hollow part intended to receive, inter alia, the intermediate part and that has a size and a shape such that this intermediate part may be attached thereto by quick-connect coupling. The expression "quick-connect coupling" is understood to mean a forcible connection of one part onto the other which does not necessarily require a supplementary part to hold the assembly together. Commercial examples of this type of connection are "fir-tree" and "quick-connect" connections, and also reliefs suitable for simple clip fastening.

Therefore, for this purpose, the intermediate part is preferably provided with a relief for quick fastening that is complementary with a corresponding relief in the casing. A groove on the outer surface of the intermediate part and a complementary channel on the inner surface of the casing allow to provide effective clip fastening.

The present invention also relates to a base plate for a tank as described above and which incorporates for this purpose a casing mounted in a leaktight manner around an orifice in the base plate and having a suitable size and shape so that an intermediate part can be fastened thereto via quick-connect coupling and so as to also receive an electrical connector.

The invention also relates to a process for connecting an electrical component of a tank for storing an internal combustion engine exhaust gas liquid additive, to a voltage source outside the tank with the aid of an electric cable and through a base plate mounted on an opening in the wall of the tank, according to which:

- at least one portion of the electric cable is inserted into an intermediate part;
- with the aid of a seal, the cable is connected to an electrical connector;
- the assembly is inserted into a casing mounted in a leaktight manner around an orifice in the base plate and the intermediate part is fastened thereto by quick-connect coupling so that the connector emerges from the orifice in the base plate to the outside of the tank.

In this process, the electric cable/intermediate part/connector assembly may be connected to the electrical component before mounting the component in the tank, which renders the mounting and the connection of the assembly particularly easy for the manufacturer of the tank.

Figure 2:
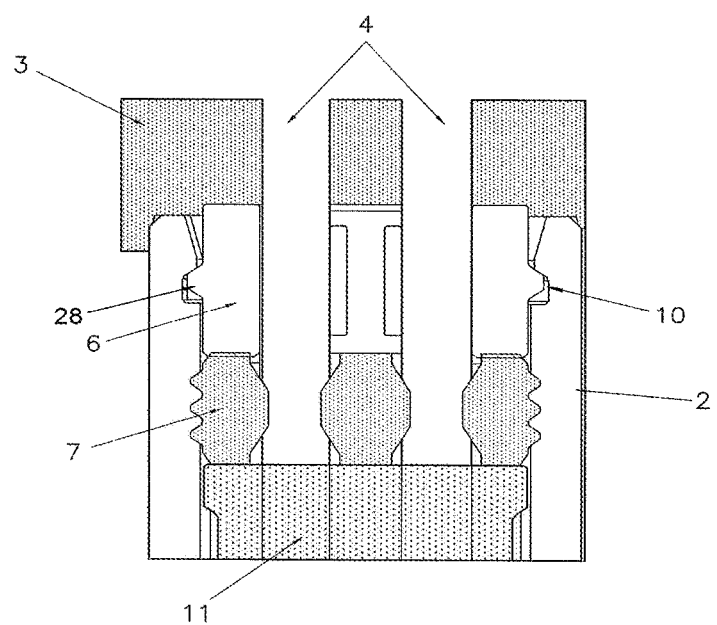
Figure 5:
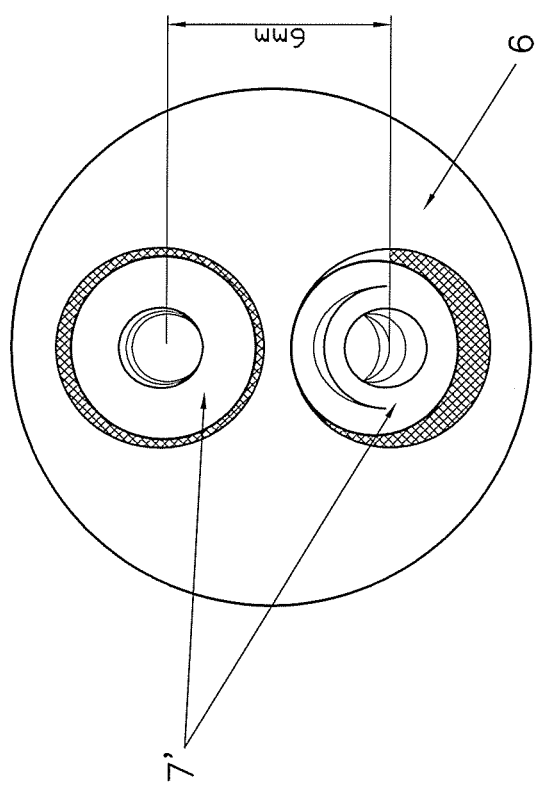
Figure 6:
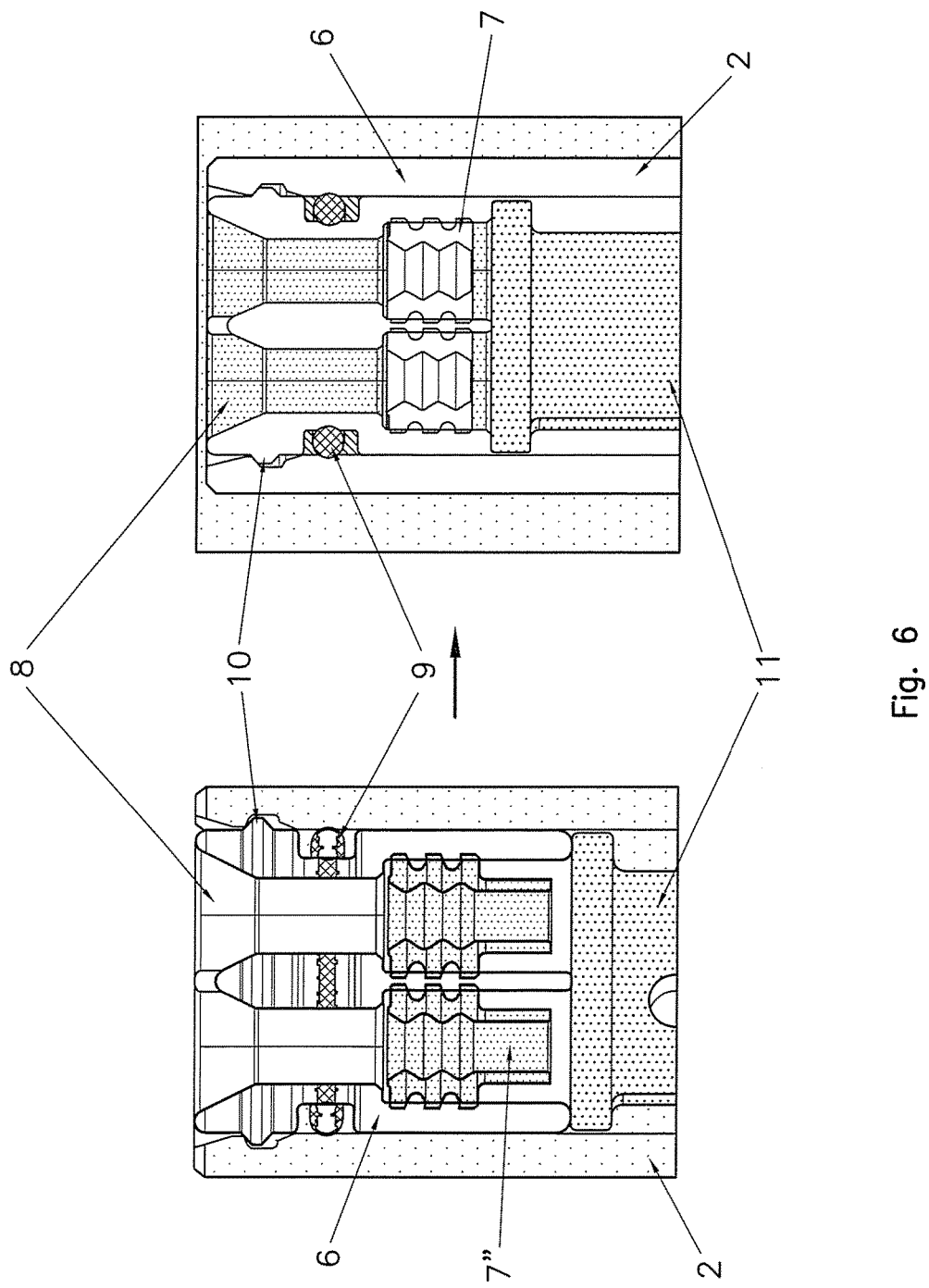

The present invention is illustrated in a non limiting way, by appended FIGS. 1 to 7, which respectively show:

FIG. 1: a cross section in a vertical median plane through the base plate of a tank according to one variant of the invention;

FIG. 2: a cross section in a vertical median plane through the leaktight casing of one variant of the base plate from FIG. 1;

FIG. 3: a cross section in a vertical median plane through the leaktight casing of another variant of the base plate from FIG. 1;

FIG. 4: a three-dimensional, expanded front view of the intermediate part contained in the leaktight casing from FIG. 3;

FIG. 5: a top view of this same intermediate part;

FIG. 6: how the system illustrated in FIGS. 3 to 5 may advantageously be modified in order to reduce its vertical space requirement;

FIG. 7: an internal view of the tank.

In these figures, the dimensions are given by way of example and identical numbers denote identical parts, namely:

1: submerged base plate intended for a tank for an aqueous solution of urea
2: leaktight casing
3: flexible heater
4: electric cables powering the heater
5: patch covering the weld of the cables to the heater
6: intermediate part
7: flexible seal
7': seals of "single wire seals" type
8: housings for the seals and the cables
9: O-ring
10: groove acting as clip
11: electrical connector In FIG. 1, an electrical component, e.g., a heater (3) of the flexible type (i.e. comprising at least one resistive track inserted between two flexible films or affixed to a flexible film, preferably made of silicone) can be seen, mounted on a base plate (1) intended to be submerged in a urea tank, i.e. to close an opening (22) in the lower wall (20) of this tank (100), shown in FIG. 7. This heater (3) is powered by two electric cables (4), two ends of which are welded to the ends of the resistive track of the heater, said weld being covered by a patch (5), preferably also made of silicone. The opposite ends of these cables are connected to an electrical connector (11) and are contained in a leaktight casing (2) moulded parting one piece with the base plate.

FIG. 2 (cross section in a vertical median plane through one variant of the casing (2)) shows how one portion of the cables (4) of the heater (3) is inserted into an intermediate part (6) clip-fastened in said casing (2) with the aid of a groove (10) that acts with a complementary channel in the casing (2) to provide a quick-connect coupling, the leaktightness of said coupling being ensured by a seal (7) forcibly mounted in said casing (2) and which, at the same time, ensures the leaktightness of the coupling of the cables (4) with the electrical connector (11).

FIG. 3 (cross section in a vertical median plane through another variant of the casing (2)) shows how an intermediate part (6), this time provided with housings (8) for two seals (7') of the "single wire seals" type, is clip-fastened in said casing (2) with the aid of a groove (10) that acts with a complementary channel in the casing (2) to provide a quick-connect coupling, the leaktightness of said coupling being ensured by an O-ring (9) housed in a groove of the intermediate part (6).

The geometry of the intermediate part (6) is illustrated in FIGS. 4 (front view) and 5 (top view). In FIG. 5 (slightly off-centred view), it is possible to see the orifices through the seals (7') intended for passing the cables through.

FIG. 6 shows how, by removing the portion of the seals intended for forcibly mounting the seals (7) in certain applications (framed in the left-hand view as 7"), and which is superfluous in this application, may be removed to give a more compact (shorter) version illustrated in the right-hand view.

The invention claimed is:

1. A tank for storing an internal combustion engine exhaust gas liquid additive, the tank comprising:
    a wall defining an internal volume;
    an electrical component located in the internal volume, the electrical component includes a flexible heater;
    a base plate mounted on an opening in a wall of the tank, the base plate incorporating a casing and including an orifice around which the casing is mounted in a leaktight manner, the casing comprising:
        an intermediate part including a passage and a clip on an outer surface of the intermediate part, the clip configured to engage a channel on an outer surface of the casing to form a quick-connect coupling by which the intermediate part is secured inside the casing;
        an electrical connector;
        at least a seal; and
        at least one electric cable configured to connect the electrical component to a voltage source outside the tank, at least one part of the electric cable being inserted into the passage of the intermediate part, the at least one electric cable being connected to the electrical connector in a leaktight manner with aid of the at least a seal, the electrical connector emerging from the orifice in the base plate to outside of the tank, wherein the seal is inserted between the intermediate part and the connector.

2. The tank according to claim 1, wherein the opening is located in a lower wall of the tank.

3. The tank according to claim 1, wherein the casing is molded as one piece with the base plate.

4. The tank according to claim 1, wherein the at least one electric cable is a stainless steel cable sheathed by a fluoropolymer and includes a silicone resin coating.

5. The tank according to claim 1, wherein the connection to the voltage source is made by the electrical connector at least partially integrated into the casing.

6. The tank according to claim 1, wherein the at least one electric cable is crimped to an electrical contact of the electrical connector.

7. The tank according to claim 1, further comprising a supplementary seal for connecting the intermediate part to the casing in a leaktight manner.

8. The tank according to claim 7, wherein the intermediate part comprises two housings for two cables each including a seal including a corrugated annulated portion.

9. The base plate for a tank according to claim 1, wherein the casing mounted in a leaktight manner around the orifice in the base plate has a size and shape configured so that an intermediate part can be fastened thereto via the quick-connect coupling and so as to receive an electrical connector.

10. A process for manufacturing a tank according to claim 1, the process comprising:
   inserting at least one portion of the at least one electric cable into the intermediate part;
   connecting the at least one electric cable to the electrical connector in a leaktight manner with the aid of the seal, forming an assembly including the at least one electric cable, the intermediate part, and the electrical connector; and
   inserting the assembly into the casing and fastening the intermediate part thereto by the quick-connect coupling so that the electrical connector emerges from the orifice in the base plate to the outside of the tank.

11. The process according to claim 10, wherein the assembly is connected to the electrical component before mounting the component in the tank.

12. The tank according to claim 1, wherein the intermediate part and the seal are in direct contact with each other.

13. The tank according to claim 1, wherein the quick-connect coupling includes an O-ring.

14. The tank according to claim 1, wherein the casing is located in the internal volume and is submerged in the additive requiring leaktight connection between the at least one electric cable and the electrical connector.

15. A tank for storing an internal combustion engine exhaust gas liquid additive, the tank comprising:
   a wall defining an internal volume;
   an electrical component located in the internal volume, the electrical component includes a flexible heater;
   a base plate mounted in an opening in a wall of the tank, the base plate incorporating a casing and including an orifice around which the casing is mounted in a leaktight manner, the casing comprising:
      an intermediate part including a passage and a clip on an outer surface of the intermediate part, the clip configured to engage a channel on an outer surface of the casing to form a quick-connect coupling by which the intermediate part is secured inside the casing;
      an electrial connector;
      at least a seal; and
      at least one electric cable configured to connect the electrical component to a voltage source outside the tank, at least one part of the electric cable being inserted into the passage of the intermediate part, the at least one electric cable being connected to the electrical connector in a leaktight manner with aid of at least the seal, the electrical connector emerging from the orifice in the base plate to outside of the tank;
   wherein the intermediate part further includes a housing, and the seal is inserted into the housing of the intermediate part.

16. A tank for storing an internal combustion engine exhaust gas liquid additive, the tank comprising:
   a wall defining an internal volume;
   an electrical component located in the internal volume, the electrical component includes a flexible heater;
   a base plate mounted on an opening in a wall of the tank, the base plate incorporating a casing and including an orifice around which the casing is mounted in a leaktight manner, the casing comprising:
      an intermediate part including a passage and a clip on an outer surface of the intermediate part, the clip configured to engage a channel on an outer surface of the casing to form a quick-connect coupling by which the intermediate part is secured inside the casing;
      an electrical connector;
      at least a seal; and
      at least one electric cable configured to connect the electrical component to a voltage source outside the tank, at least one part of the electric cable being inserted into the passage of the intermediate part, the at least one electric cable being connected to the electrical connector in a leaktight manner with aid of at least the seal, the electrical connector emerging from the orifice in the base plate to outside of the tank;
   wherein the intermediate part further includes a housing, and the seal is inserted between the intermediate part and the connector and into the housing of the intermediate part.

* * * * *